(12) United States Patent
Park et al.

(10) Patent No.: US 9,887,575 B2
(45) Date of Patent: Feb. 6, 2018

(54) WIRELESS CHARGING EQUIPMENT, TERMINAL, WIRELESS CHARGING SYSTEM COMPRISING THE SAME, CONTROL METHOD THEREOF AND NON-TRANSITORY COMPUTER READABLE STORAGE MEDIUM HAVING COMPUTER PROGRAM RECORDED THEREON

(71) Applicant: SK Planet Co., Ltd., Gyeonggi-do (KR)

(72) Inventors: Yon Won Park, Gyeonggi-do (KR); Hyun Wook Kim, Gyeonggi-do (KR); Seung Won Na, Seoul (KR); Seong Wook Kang, Gyeonggi-do (KR)

(73) Assignee: SK PLANET CO., LTD., Seongnam-Si, Gyeonggi-Do (KR)

( * ) Notice: Subject to any disclaimer, the term of this patent is extended or adjusted under 35 U.S.C. 154(b) by 238 days.

(21) Appl. No.: 14/894,950

(22) PCT Filed: Nov. 5, 2014

(86) PCT No.: PCT/KR2014/010556
§ 371 (c)(1),
(2) Date: Nov. 30, 2015

(87) PCT Pub. No.: WO2015/156468
PCT Pub. Date: Oct. 15, 2015

(65) Prior Publication Data
US 2016/0126775 A1    May 5, 2016

(30) Foreign Application Priority Data

Apr. 8, 2014   (KR) ........................ 10-2014-0042045
Jun. 23, 2014  (KR) ........................ 10-2014-0076752

(Continued)

(51) Int. Cl.
H02J 7/00 (2006.01)
H02J 7/02 (2016.01)
(Continued)

(52) U.S. Cl.
CPC ............ H02J 7/025 (2013.01); H02J 7/0042 (2013.01); H02J 7/04 (2013.01); H02J 50/12 (2016.02); H02J 50/80 (2016.02)

(58) Field of Classification Search
CPC ...................................................... H02J 7/025
(Continued)

(56) References Cited

U.S. PATENT DOCUMENTS

2011/0043163 A1  2/2011  Baarman
2011/0059762 A1  3/2011  Jones, IV et al.
(Continued)

FOREIGN PATENT DOCUMENTS

KR    10-2008-0104835 A    12/2008
KR    10-2012-0090999 A    8/2012

OTHER PUBLICATIONS

International Search Report in PCT International Application No. PCT/KR2014/010556, dated Feb. 13, 2015.

*Primary Examiner* — Suresh Memula
(74) *Attorney, Agent, or Firm* — Fenwick & West LLP

(57) ABSTRACT

Provided are wireless charging equipment, a terminal, a wireless charging system comprising the same, a control method thereof, and a non-transitory computer readable storage medium having computer program recorded thereon. That is, the present invention can easily implement the present invention without a separate BLE beacon device by using the wireless charging infrastructure and improve operation efficiency of the entire wireless charging system by transmitting additional information (alternatively, specific information) to the peripheral BLE terminal for a time (Continued)

where the charging signal is not transmitted in the corresponding BLE by using the BLE of the resonance scheme wireless charging equipment.

8 Claims, 11 Drawing Sheets

(30) Foreign Application Priority Data

Jun. 23, 2014 (KR) .................. 10-2014-0076777
Jun. 24, 2014 (KR) .................. 10-2014-0077414

(51) Int. Cl.
*H02J 7/04* (2006.01)
*H02J 50/12* (2016.01)
*H02J 50/80* (2016.01)

(58) Field of Classification Search
USPC .......................................... 320/108
See application file for complete search history.

(56) References Cited

U.S. PATENT DOCUMENTS

| | | |
|---|---|---|
| 2013/0065584 A1 | 3/2013 | Lyon et al. |
| 2013/0257365 A1 | 10/2013 | Redding |
| 2015/0242899 A1* | 8/2015 | Farhi .............. G06Q 30/0261 705/14.58 |
| 2015/0304947 A1* | 10/2015 | Maruhashi .......... H04W 48/08 370/311 |

* cited by examiner

WIRELESS CHARGING EQUIPMENT, TERMINAL, WIRELESS CHARGING SYSTEM COMPRISING THE SAME, CONTROL METHOD THEREOF AND NON-TRANSITORY COMPUTER READABLE STORAGE MEDIUM HAVING COMPUTER PROGRAM RECORDED THEREON

CROSS-REFERENCE TO RELATED APPLICATION

This application is the U.S. national phase of PCT Application No. PCT/KR2014/010556 filed on Nov. 5, 2014, which claims the benefit of Korean Application Nos. 10-2014-0042045 filed on Apr. 8, 2014, 10-2014-0076752 filed on Jun. 23, 2014, 10-2014-0076777 filed on Jun. 23, 2014 and 10-2014-0077414 filed on Jun. 24, 2014 with the Korean Intellectual Property Office, the disclosures of which are incorporated herein by reference.

BACKGROUND OF THE INVENTION

1. Field of the Invention

The present invention relates to wireless charging equipment, a terminal, a wireless charging system comprising the same, a control method thereof, and a non-transitory computer readable storage medium having computer program recorded thereon.

2. Description of the Related Art

Wireless charging equipment (alternatively, a wireless power transmitting unit) is a power transferring device which wirelessly transfers power required for an electronic device.

The wireless charging equipment communicates with a terminal adjacent to the corresponding wireless charging equipment, and the corresponding wireless charging equipment transmits a charging signal to the corresponding terminal, the terminal charges a battery provided in the corresponding terminal based on the charging signal, and thus, there is an inefficient aspect in that services other than a battery charging function cannot be provided.

SUMMARY OF THE INVENTION

An object of the present invention is to provide wireless charging equipment, a terminal, a wireless charging system comprising the same, a control method thereof, and a non-transitory computer readable storage medium having computer program recorded thereon for transmitting additional information via BLE in the A4WP (Alliance for Wireless Power) wireless charging system.

Another object of the present invention is to provide wireless charging equipment, a terminal, a wireless charging system comprising the same, a control method thereof, and a non-transitory computer readable storage medium having computer program recorded thereon for broadcasting additional information by the wireless charging equipment through Bluetooth Low Energy while not transmitting powers.

Yet another object of the present invention is to provide wireless charging equipment, a terminal, a wireless charging system comprising the same, a control method thereof, and a non-transitory computer readable storage medium having computer program recorded thereon for improving operation efficiency by collecting information on the terminal through Bluetooth low energy (BLE) in wireless charging to transmit the collected information to the service providing device.

Still another object of the present invention is to provide wireless charging equipment, a terminal, a wireless charging system comprising the same, a control method thereof, and a non-transitory computer readable storage medium having computer program recorded thereon for performing the update function for the firmware installed in the terminal by interlocking with the service providing device by the terminal, when the predetermined event corresponding to a case where there is no terminal operation for a predetermined time while the terminal is charging through the wireless charging equipment, a case where the terminal enters into a standby state, a case corresponding to immediately after the charging starts according to the predetermined set information, and the like, occurs.

Still yet another object of the present invention is to provide wireless charging equipment, a terminal, a wireless charging system comprising the same, a control method thereof, and a non-transitory computer readable storage medium having computer program recorded thereon for dividing the entire power providable in the wireless charging equipment into the plurality of channels, allocating one or more channels corresponding to the class information of the corresponding terminal among the plurality of channels divided based on the predetermined class information with respect to the terminal to perform the charging function through the corresponding wireless charging equipment, and providing the power (alternatively, the wireless charging intensity) corresponding to one or more allocated channels to the corresponding terminal, in the wireless charging equipment and one or more terminals communicating through the BLE additionally defined in the A4WP scheme wireless charging.

Still yet another object of the present invention is to provide wireless charging equipment, a terminal, a wireless charging system comprising the same, a control method thereof, and a non-transitory computer readable storage medium having computer program recorded thereon for setting the power (alternatively, the wireless charging intensity) for each terminal based on the class information set for each terminal with respect to the plurality of terminals to perform the charging function through the wireless charging equipment and providing the set power to each corresponding terminal.

According to an aspect of the present invention, wireless charging equipment includes: a communication unit configured to communicate based on a Bluetooth low energy (BLE) scheme; and a control unit configured to control the communication unit to verify the number of terminals connected to the wireless charging equipment including the communication unit, verify a standby time period when the charging signal is not transmitted to the terminal connected to the wireless charging equipment in a time slot based on the verified number of terminals, and transmit a beacon signal including additional information based on the verified standby time period by a broadcasting method.

Preferably, the control unit may predict the standby time period when the charging signal is not transmitted to the terminal connected to the wireless charging equipment based on the verified number of terminals.

Preferably, the additional information may include coupon information and product information in a store where the wireless charging equipment is installed.

Preferably, the control unit may control the communication unit to verify a time period when the beacon signal including the additional information is transmittable in the standby time period and transmit the beacon signal to the terminal at the verified time period when the beacon signal is transmittable.

Preferably, the control unit may control the communication unit to transmit the beacon signal to the terminal connected to the wireless charging equipment.

According to another aspect of the present invention, a terminal includes: a communication unit configured to communicate based on a BLE scheme and transmit a charging signal transmission request signal to wireless charging equipment at a predetermined time interval; and a control unit configured to charge a battery based on a charging signal transmitted from the wireless charging equipment in response to the charging signal transmission request signal, control the communication unit to receive a beacon signal including additional information transmitted from the wireless charging equipment at a time period when the charging signal is not received other than the predetermined time interval, and perform an operation corresponding to the additional information included in the received beacon signal.

According to yet another aspect of the present invention, a control method of wireless charging equipment includes: communicating with one or more terminals based on a BLE scheme by means of a communication unit; verifying the number of terminals connected to the wireless charging equipment including the communication unit by means of a control unit; verifying a standby time period when a charging signal is not transmitted to the terminal connected to the wireless charging equipment in a time slot based on the verified number of terminals by means of the control unit; and controlling the communication unit to transmit a beacon signal including additional information based on the verified standby time period by a broadcasting method by means of the control unit.

Preferably, the controlling of the communication unit to transmit the beacon signal may include: verifying a time period when the beacon signal is transmittable in the verified standby time period by means of the control unit; and controlling the communication unit to transmit the beacon signal to the terminal connected to the wireless charging equipment at the verified time period when the beacon signal is transmittable, respectively.

According to still another aspect of the present invention, a control method of a terminal includes: communicating with wireless charging equipment based on a BLE scheme and transmitting a charging signal transmission request signal to the wireless charging equipment at a predetermined time interval by means of a communication unit; charging a battery based on a charging signal transmitted from the wireless charging equipment in response to the charging signal transmission request signal by means of a control unit; receiving a beacon signal including additional information transmitted from the wireless charging equipment at a time period when the charging signal is not received other than the predetermined time interval by means of the communication unit; and performing an operation corresponding to the additional information included in the received beacon signal by means of the control unit.

According to still yet another aspect of the present invention, a computer program executing the methods according to the aforementioned embodiments may be stored in a non-transitory computer readable storage medium having a computer program recorded thereon.

According to still yet another aspect of the present invention, a wireless charging system includes: a terminal configured to be wirelessly charged by an alliance for wireless power (A4WP) scheme; and wireless charging equipment configured to verify a standby time period when the charging signal is not transmitted to the terminal in a time slot based on the verified number of terminals and transmit a beacon signal including additional information based on the verified standby time period by a broadcasting method.

According to still yet another aspect of the present invention, wireless charging equipment includes: a communication unit including a first communication means communicating based on a BLE scheme; and a control unit configured to control the communication unit to verify terminals connected to the wireless charging equipment including the communication unit and collect terminal information of the verified terminals.

According to still yet another aspect of the present invention, a terminal includes: a communication unit configured to communicate with wireless charging equipment based on a BLE scheme; a battery configured to be charged based on a charging signal transmitted from the wireless charging equipment; and a control unit configured to control the communication unit to communicate with the service providing device, control the communication unit to transmit a firmware version information request signal to the service providing device, control the communication unit to receive a firmware version information response signal transmitted from the service providing device in response to the transmitted firmware version information request signal, and determine whether to perform an update function for the firmware installed in the terminal based on the received firmware version information response signal, when any one of a case where there is no terminal operation for a predetermined time while the terminal is charging through the wireless charging equipment, a case where the terminal including the communication unit enters into a predetermined standby state, and a case corresponding to immediately after the charging starts according to the predetermined set information occurs.

According to still yet another aspect of the present invention, wireless charging equipment includes: a communication unit configured to communicate with a terminal based on a BLE scheme; and a control unit configured to verify predetermined class information for the terminal in class information for each terminal pre-stored based on identification information of the terminal, allocate one or more channels corresponding to the verified class information for the terminal in a plurality of pre-divided channels, and provide a wireless charging function to the terminal with a wireless charging intensity corresponding to one or more allocated channels.

As described above, according to the present invention, it is possible to easily implement the embodiment of the present invention without a separate BLE beacon device by using a wireless charging infrastructure by transmitting additional information (alternatively, specific information) through the BLE additionally defined in the A4WP scheme wireless charging.

Further, it is possible to improve operation efficiency of the entire wireless charging system by transmitting the broadcasting signal (alternatively, additional/specific information) to the peripheral BLE terminal for a time where the charging signal is not transmitted in the BLE installed in the wireless charging equipment.

Further, it is possible to improve operation efficiency of the wireless charging system by collecting information on the terminal through BLE in wireless charging to transmit the collected information on the terminal to the service providing device.

Further, it is possible to enlarge an application range of the wireless charging system, improve convenience of the user, and perform a stable update by continuously receiving the power from the wireless charging equipment in the firmware update process, by performing the update function for the firmware installed in the terminal by interlocking with the service providing device by the terminal, when the predetermined event corresponding to a case where there is no terminal operation for a predetermined time while the terminal is charging through the wireless charging equipment, a case where the terminal enters into a standby state, a case corresponding to immediately after the charging starts according to the predetermined set information, and the like, occurs.

Further, it is possible to reduce power consumption cost of the wireless charging equipment and improve operation efficiency of the wireless charging system by dividing the entire power providable in the wireless charging equipment into the plurality of channels, allocating one or more channels corresponding to the class information of the corresponding terminal among the plurality of channels divided based on the predetermined class information with respect to the terminal to perform the charging function through the wireless charging equipment, and providing the power (alternatively, the wireless charging intensity) corresponding to one or more allocated channels to the corresponding terminal, in the wireless charging equipment and one or more terminals communicating through the BLE additionally defined in the A4WP scheme wireless charging.

Further, it is possible to charge the power for each terminal and improve satisfaction and convenience of the user by establishing a retention service strategy for each terminal due to differentiation of the power supply, by setting the power (alternatively, the wireless charging intensity) for each terminal based on the class information set for each terminal with respect to the plurality of terminals to perform the charging function through the wireless charging equipment and providing the set power to each corresponding terminal.

DETAILED DESCRIPTION OF THE PREFERRED EMBODIMENTS

Figure 1:
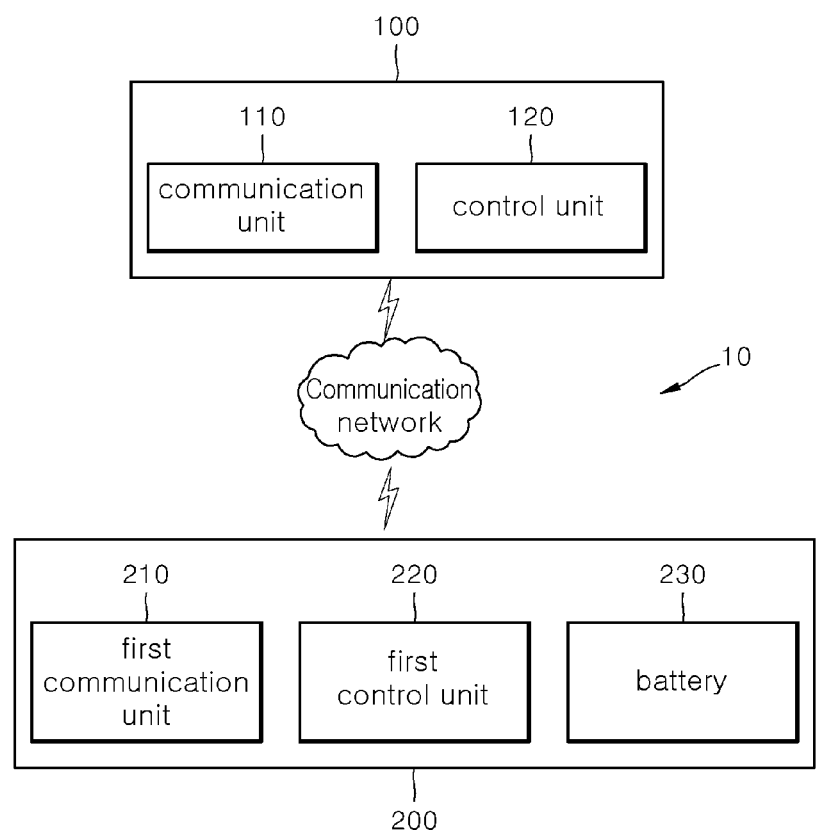
FIG. 1 is a block diagram illustrating a configuration of a wireless charging system according to an embodiment of the present invention.

It is noted that technical terms used in the present invention are used to just describe a specific embodiment and do not intend to limit the present invention. Further, if the technical terms used in the present invention are not particularly defined as other meanings in the present invention, the technical terms should be appreciated as meanings generally appreciated by those skilled in the art and should not be appreciated as excessively comprehensive meanings or excessively reduced meanings. Further, when the technical term used in the present invention is a wrong technical term that does not accurately express the spirit of the present invention, the technical term should be understood by being substituted by a technical term which can be correctly understood by those skilled in the art. In addition, a general term used in the present invention should be interpreted as defined in a dictionary or contextually, and should not be interpreted as an excessively reduced meaning.

In addition, singular expressions used in the present invention include plurals expressions unless they have definitely opposite meanings. In the present invention, it should not analyzed that a term such as "comprising" or "including" particularly includes various components or various steps disclosed in the specification and some component or some steps among them may not included or additional components or steps may be further included.

In addition, terms including ordinal numbers, such as 'first' and 'second', used in the present invention can be used to describe various components, but the components should not be limited by the terms. The above terms are used only to discriminate one component from the other components. For example, a first component may be named a second component and similarly, the second component may also be named the first component, without departing from the scope of the present invention.

Hereinafter, preferable exemplary embodiment of the present invention will be described in more detail with reference to the accompanying drawings. Like reference numerals refer to like elements for easy overall understanding and a duplicated description of like elements will be omitted.

Further, in the following description, a detailed explanation of known related technologies may be omitted to avoid unnecessarily obscuring the subject matter of the present invention. Further, it is noted that the accompanying drawings are only for easily understanding the spirit of the present invention and it should not be interpreted that the spirit of the present invention is limited by the accompanying drawings.

FIG. 1 is a block diagram illustrating a configuration of a wireless charging system 10 according to an embodiment of the present invention.

As illustrated in FIG. 1, the wireless charging system 10 is constituted by wireless charging equipment 100 and a terminal 200. All the constituent elements of the wireless charging system 10 illustrated in FIG. 1 are not required constituent elements, and the wireless charging system 10 may be implemented by more constituent elements than the constituent elements illustrated in FIG. 1 or less constituent elements therethan. Here, the wireless charging equipment 100 and the terminal 200 charge a battery provided in the corresponding terminal 200 based on a charging signal transmitted from the wireless charging equipment 100 through alliance for wireless power (A4WP) scheme (alternatively, a magnetic resonance scheme). Further, the corresponding wireless charging equipment 100 and the terminal 200 uses BLE for low power in a Bluetooth.

The wireless charging equipment 100 verifies the number of one or more terminals 200 including a connected PRU. Thereafter, the wireless charging equipment 100 verifies an empty time zone in which the charging signal is not transmitted to one or more connected terminals 200 in a time slot (alternatively, a time sequence) based on the verified number of terminals. Thereafter, the wireless charging equipment 100 transmits a beacon signal including additional information to one or more terminals 200 at the verified empty time zone and the corresponding terminal 200 performs an operation corresponding to the corresponding additional information based on the beacon signal including the additional information transmitted from the wireless charging equipment 100.

As illustrated in FIG. 1, the wireless charging equipment 100 (alternatively, a power transmitting unit PTU) is constituted by a communication unit 110 and a control unit 120. All the constituent elements of the wireless charging equipment 100 illustrated in FIG. 1 are not required constituent elements, and the wireless charging equipment 100 may be implemented by more constituent elements than the constituent elements illustrated in FIG. 1 or less constituent elements therethan.

The communication unit 110 communicates with another terminal using a Bluetooth low energy (BLE) scheme by using BLE.

Further, the communication unit 110 transmits a power beacon signal for communication with another terminal using the BLE scheme by a control of the control unit 120.

The control unit 120 executes an overall control function of the wireless charging equipment 100.

Further, the control unit 120 generates the power beacon signal at a predetermined time interval, in the A4WP scheme wireless charging.

Further, the control unit 120 transmits the generated power beacon signal through the communication unit 110 at the predetermined time interval.

Further, the control unit 120 receives a control signal (alternatively, a PRU advertisement signal) transmitted from the terminal 200 receiving the corresponding power beacon signal through the communication unit 110 in response to the transmitted power beacon signal.

Further, the control unit 120 communicates with the corresponding terminal 200 adjacent to the corresponding wireless charging equipment 100 based on the received control signal.

Further, the control unit 120 schedules a time for transmitting the corresponding charging signal to one or more terminals 200 connected with the corresponding wireless charging equipment 100 among time slots (alternatively, time sequence/a total data transmittable time) in order to transmit the charging signal to one or more terminals 200 connected with the corresponding wireless charging equipment 100.

Further, the control unit 120 controls an inductor (not illustrated) and a capacitor (not illustrated) which are included in the wireless charging equipment 100 to generate the charging signal. In this case, the wireless charging equipment 100 generates a charging signal for wireless charging by a resonance coupling scheme.

Further, the control unit 120 may also transmit the charging signal generated based on the scheduled time slot to a specific terminal in the terminals 200 connected to the corresponding wireless charging equipment 100 at the predetermined time interval (for example, 250 ms).

In this case, in the case of a plurality of terminals 200 connected to the corresponding wireless charging equipment 100, the control unit 120 may individually generate a charging signal for transmitting to each of the plurality of terminals 200 and transmit the individually generated charging signal to each corresponding terminal 200. Further, in the case of the plurality of terminals 200 connected to the corresponding wireless charging equipment 100, the control unit 120 may generate one charging signal for transmitting to each of the plurality of terminals 200 and transmit one generated charging signal to each of the plurality of terminals 200.

Further, the control unit 120 may also transmit the charging signal to the corresponding terminal 200 based on a control signal (alternatively, a charging signal transmission request signal) (for example, including a PRU dynamic parameter) transmitted from the terminal 200.

Further, the control unit 120 verifies (alternatively, determines) the number of terminals connected to the corresponding wireless charging equipment 100.

Further, the control unit 120 verifies (alternatively, determines/predicts) an empty time period (alternatively, an idle/standby time period) without transmitting the corresponding charging signal to one or more terminals 200 connected with the corresponding wireless charging equipment 100 in the time slot (alternatively, the total data transmittable time) based on the verified number of terminals, in order to verify a time period (alternatively, a time/time zone) without transmitting the charging signal to one or more terminals 200 connected with the corresponding wireless charging equipment 100.

That is, the control unit 120 verifies the remaining time period (alternatively, the empty time period/empty time zone) except for the time of transmitting the charging signal to one or more terminals in the time slot based on the verified number of terminals.

Further, the control unit 120 may also verify the remaining time period without transmitting the charging signal in the scheduled time slot based on the scheduled time slot.

Further, the control unit 120 generates a beacon signal including additional information. Here, the additional information includes coupon information, product information, and the like in a store (alternatively, an area/a region) where the corresponding wireless charging equipment 100 is installed (alternatively, provided).

Figure 2:
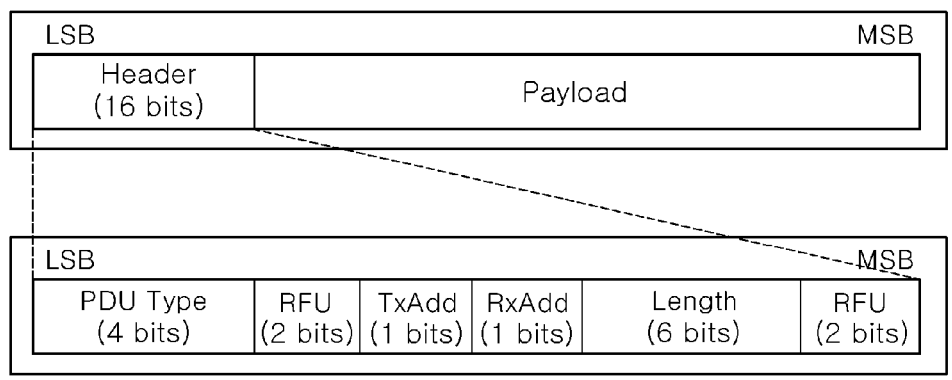
FIG. 2 is a diagram illustrating a data structure according to the embodiment of the present invention.

For example, in a data structure of an advertisement channel illustrated in FIG. 2, the control unit 120 generates the beacon signal including the corresponding additional information by inserting the additional information to a payload region of the corresponding data structure.

Further, the control unit 120 transmits the beacon signal generated based on the verified empty time period to one or more terminals 200 connected to the corresponding wireless charging equipment 100 through the communication unit 110, respectively. In this case, the control unit 120 may transmit the beacon signal including the corresponding additional information to one or more terminals 200 connected to the wireless charging equipment 100 through a data channel, an advertising channel, and the like which are defined in the BLE, respectively.

That is, the control unit 120 verifies a time period enough to transmit the additional information in the verified empty time period and transmits the beacon signal including the corresponding additional information to one or more terminals 200 in the verified time period enough to transmit the additional information. In this case, the wireless charging equipment 100 may also transmit the beacon signal by a broadcasting scheme.

As illustrated in FIG. 1, the terminal 200 is constituted by a first communication unit 210, a first control unit 220, and a battery 230. All the constituent elements of the terminal 200 illustrated in FIG. 1 are not required constituent elements, and the terminal 200 may be implemented by more constituent elements than the constituent elements illustrated in FIG. 1 or less constituent elements therethan. Here, the terminal 200 includes a power receiving unit (PRU) (not illustrated).

The first communication unit 210 communicates with another terminal using the BLE scheme by using the BLE.

Further, the first communication unit 210 receives a power beacon signal transmitted from the wireless charging equipment 100.

The first control unit 220 executes an overall control function of the terminal 200.

Further, the first control unit 220 transmits the control signal (for example, the PRU advertisement signal) to the wireless charging equipment 100 through the first communication unit 210 in order to request connection (alternatively, communication) with the corresponding wireless charging equipment 100 based on the power beacon signal transmitted from the wireless charging equipment 100, in the A4WP scheme wireless charging.

Further, the first control unit 220 establishes the connection (alternatively, communication) with the corresponding wireless charging equipment 100 based on the transmitted control signal.

Further, the first control unit 220 transmits a control signal (alternatively, a charging signal transmission request signal) (for example, including a PRU dynamic parameter) to the wireless charging equipment 100 at a predetermined time interval.

Further, the first control unit 220 controls a charging signal transmitted from the wireless charging equipment 100 to be received through the first communication unit 210 at the predetermined time interval. In this case, the first control unit 220 may also control the charging signal transmitted from the wireless charging equipment 100 to be received through the first communication unit 210 in response to the above-transmitted control signal (for example, including the PRU dynamic parameter).

Further, the first control unit 220 charges the battery 230 based on the received charging signal. In this case, the terminal 220 may further include an additional constituent element for charging the corresponding battery 230 by a resonance coupling method with the wireless charging equipment 100.

Further, the first control unit 220 controls the beacon signal including the additional information transmitted from the corresponding wireless charging equipment 100 to be received through the first communication unit 210 in an empty time period without transceiving the charging signal to the wireless charging equipment 100. Here, the additional information includes coupon information, product information, and the like in a store (alternatively, an area/a region) where the corresponding wireless charging equipment 100 is installed (alternatively, provided).

Further, the first control unit 220 performs an operation (alternatively, a control) corresponding to the additional information based on the additional information included in the received beacon signal.

Further, the first control unit 220 displays the operation performed result on a display unit (not illustrated).

The battery 230 supplies the power to the corresponding terminal 200.

Further, the battery 230 performs a charging function based on the charging signal transmitted from the wireless charging equipment 100 by a control of the first control unit 220.

As such, in the A4WP scheme wireless charging, the additional information (alternatively, specific information) may be transmitted through additionally defined BLE.

Further, a broadcasting signal (alternatively, additional/specific information) may be transmitted to a peripheral BLE terminal at the time when the charging signal is not transmitted to the BLE installed in the wireless charging equipment.

Figure 3:
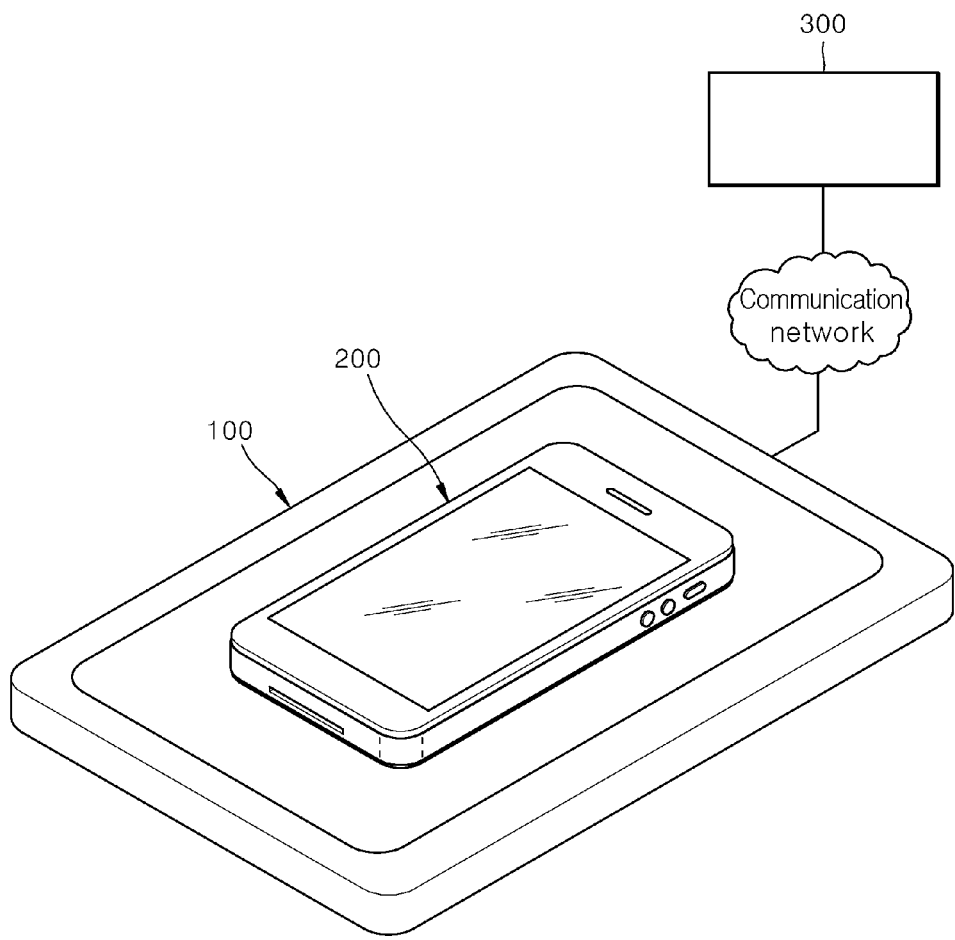
FIG. 3 illustrates the wireless charging system according to the embodiment of the present invention.

FIG. 3 illustrates the wireless charging system according to the embodiment of the present invention. As illustrated in FIG. 3, the wireless charging system may include the wireless charging equipment 100 (alternatively, a wireless power transmitting unit), a terminal 200 (alternatively, a wireless power receiving unit) receiving wireless power, and the service providing device 300.

The wireless charging equipment 100 as equipment for charging the terminal 200 may transmit wireless power to the terminal 200 at a predetermined distance. The wireless charging equipment 100 may sense whether the terminal 200 exists in an area where the power may be wirelessly transmitted and transmit the wireless power to the terminal 200 by an induction method or a resonance method.

Further, the wireless charging equipment 100 may collect information of the terminal 200 and transmit the collected terminal information to the service providing device 300 through the communication network.

The terminal 200 as an electronic device capable of being wirelessly charged may charge the battery 230 by receiving the wireless power from the wireless charging equipment 100.

In the terminal 200 described in the present invention, a mobile phone, a smart phone, a laptop computer, personal digital assistants (PDA), a portable multimedia player (PMP), a navigation system, and the like may be included.

The terminal 200 may charge a battery based on inductive coupling from the wireless charging equipment 100. Alternatively, the battery may be charged based on planar wave radiation from the wireless charging equipment 100.

The wireless charging equipment 100 may include a transmission antenna for an energy transmission means, and the terminal 200 may include a reception antenna for an energy reception means.

Further, the terminal 200 may store the terminal information and transfer the terminal information to the wireless charging equipment 100 through the BLE.

A communication module for short range communication may be used between the wireless charging equipment 100 and the terminal 200, and as a short range communication technique, Bluetooth, radio frequency identification (RFID), infrared data association (IrDA), ultra wideband (UWB), ZigBee, or the like may be used. In the embodiment of the present invention, a short range communication technique using the BLE will be described as an example.

To this end, the wireless charging equipment 100 and the terminal 200 provide communication units, respectively.

The wireless charging equipment 100 may receive the terminal information from the terminal 200 and transmit the received terminal information to the service providing device 300 through the communication network.

The process of receiving the terminal information from the terminal 200 by the wireless charging equipment 100 may be performed after a process of determining whether the terminal 200 is pre-registered and a process of agreeing to transfer the terminal information by the terminal 200 according to a setting even in the non-registration.

Further, even though the terminal 200 is registered in the wireless charging equipment 100, in the case of performing the agreement including the process of agreeing to transfer the terminal information, the terminal information may be set to be received from the terminal 200.

The wireless charging equipment 100 transmits power for charging the terminal 200 and receives the terminal information from the terminal 200 after the terminal 200 is pre-registered or the terminal 200 agrees to transfer the terminal information even though the terminal 200 is not the registered terminal to transfer the received terminal information to the service providing device 300.

The process of receiving the terminal information from the terminal 200 by the wireless charging equipment 100 may be performed through the BLE, and the process of transferring the terminal information received from the terminal 200 to the service providing device 300 by the wireless charging equipment 100 may be performed through the communication network.

The communication network may use a wired or wireless internet technique, and as the wireless internet technique, wireless LAN (WLAN) (Wi-Fi), wireless broadband (Wi-bro), world interoperability for microwave access (Wimax), high speed downlink packet access (HSDPA), or the like, may be used.

Figure 4:
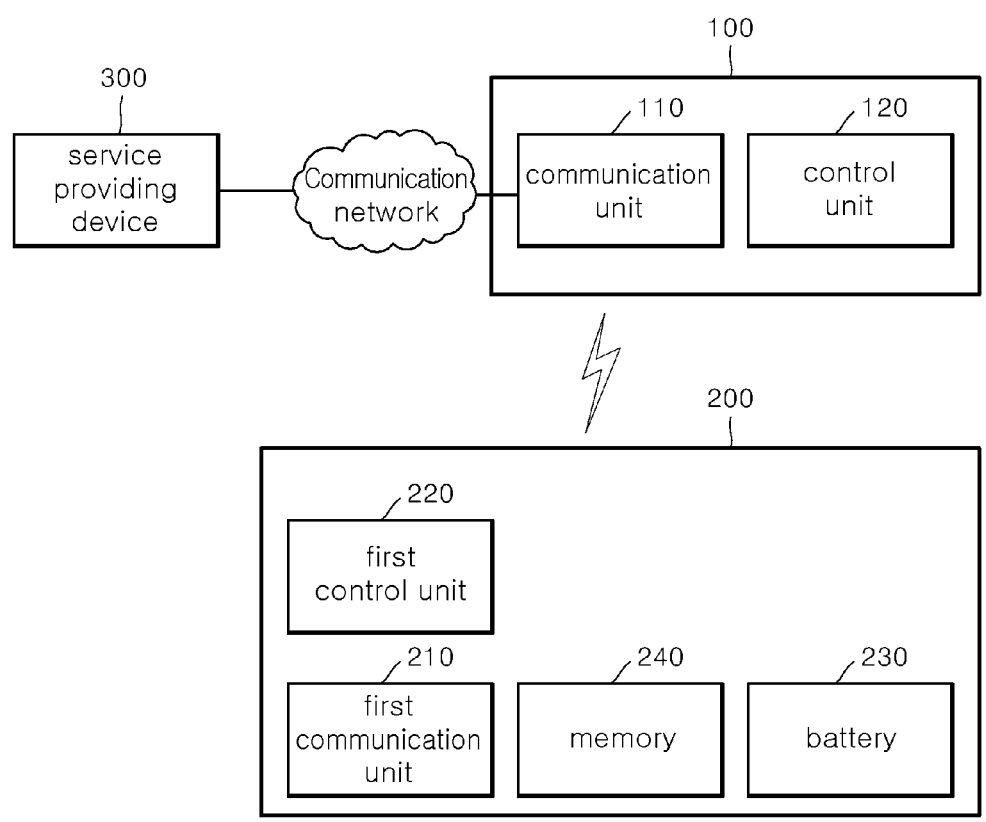
FIG. 4 is a block diagram illustrating a detailed configuration of the wireless charging system according to the embodiment of the present invention.

FIG. 4 is a block diagram illustrating a detailed configuration of the wireless charging system according to the embodiment of the present invention.

As illustrated in FIG. 4, the wireless charging system according to the embodiment of the present invention is constituted by the wireless charging equipment 100 and the terminal 200. All the constituent elements of the wireless charging system illustrated in FIG. 4 are not required constituent elements, and the wireless charging system may be implemented by more constituent elements than the constituent elements illustrated in FIG. 4 or less constituent elements therethan.

The battery provided in the terminal 200 is charged based on the charging signal transmitted from the wireless charging equipment 100. The wireless charging equipment 100 may collect the terminal information from the terminal 200 in addition to supplying the charging power to the terminal 200. To this end, the wireless charging equipment 100 and the terminal 200 may include communication units using BLE for low power in Bluetooth, respectively.

One wireless charging equipment 100 may supply power for wireless charging to a plurality of terminals 200.

As illustrated in FIG. 4, the wireless charging equipment 100 (alternatively, a power transmitting unit PTU) is constituted by a communication unit 110 and a control unit 120.

The communication unit 110 communicates with the terminal 200 using a BLE scheme by using Bluetooth low energy (BLE). The communication unit 110 may receive user information from the terminal 200 by using the BLE. Further, the communication unit 110 separately includes a communication means transmitting the user information to the service providing device 300 through the communication network in addition to the BLE communication means for receiving the user information from the terminal 200.

The control unit 120 executes an overall control function of the wireless charging equipment 100. In detail, the control unit 120 may control processes of supplying power to the terminal 200 adjacent to the corresponding wireless charging equipment 100 based on a control signal and collecting the terminal information to control to transfer the collected terminal information to the service providing device 300.

The control unit 120 controls an inductor (not illustrated) and a capacitor (not illustrated) which are included in the wireless charging equipment 100 to generate the charging signal. In this case, the wireless charging equipment 100 may generate the charging signal for wireless charging by a resonance coupling scheme.

Further, the control unit 120 transmits the generated charging signal to a specific terminal among the terminals 200 connected to the corresponding wireless charging equipment 100 at the predetermined time interval (for example, 250 ms).

The control unit 120 may verify the number of terminals connected to the corresponding wireless charging equipment 100.

In this case, in the case of a plurality of terminals 200 connected to the corresponding wireless charging equipment 100, the control unit 120 may individually generate a charging signal for transmitting to each of the plurality of terminals 200 and transmit the individually generated charging signal to each corresponding terminal 200.

Further, in the case of the plurality of terminals 200 connected to the corresponding wireless charging equipment 100, the control unit 120 may generate one charging signal for transmitting to each of the plurality of terminals 200 and transmit one generated charging signal to each of the plurality of terminals 200.

Further, the control unit 120 may also transmit the charging signal to the corresponding terminal 200 based on a control signal (alternatively, a charging signal transmission request signal) (for example, including a PRU dynamic parameter) transmitted from the terminal 200.

Further, the control unit 120 controls the charging signal to be transmitted to one or more terminals 200 connected with the corresponding wireless charging equipment 100 and simultaneously, may collect the terminal information from the terminal 200.

The terminal information may include information collected through the charging function of the wireless charging equipment 100 such as a place for wireless charging, a time for wireless charging, a charging frequency, the number of terminals which are simultaneously charged in order to determine dense population, terminals charged frequently on a wireless charging history together, and a charging amount of the terminal, and personal information such as gender and age of the user of the terminal 200.

Whether the information which may be collected through the charging function and the personal information are supplied to the wireless charging equipment 100 may vary according to a setting.

The wireless charging equipment 100 may transfer the collected information to the service providing device 300 through the communication network.

The communication network may use a wired or wireless internet technique, and as the wireless internet technique, wireless LAN (WLAN) (Wi-Fi), wireless broadband (Wibro), world interoperability for microwave access (Wimax), high speed downlink packet access (HSDPA), or the like, may be used.

The terminal 200 includes a power receiving unit (PRU) (not illustrated) and includes a first communication unit 210, a first control unit 220, a battery 230, and a memory 240.

The first communication unit 210 communicates with the wireless charging equipment 100 using the BLE scheme by using the BLE. Further, the first communication unit 210 communicates with another terminal.

The first control unit 220 executes an overall control function of the terminal 200. Further, the first control unit 220 controls a charging signal transmitted from the wireless charging equipment 100 to be received at the predetermined time interval. In this case, the first control unit 220 controls the charging signal transmitted from the wireless charging equipment 100 to be received in response to the above transmitted control signal.

Accordingly, the battery 230 is charged based on the received charging signal. In this case, the terminal 220 may further include an additional constituent element for charging the corresponding battery 230 by a resonance coupling method with the wireless charging equipment 100.

Further, the first control unit 220 controls a signal including the terminal information transmitted from the corresponding wireless charging equipment 100 to be received through the first communication unit 210, while transceiving the charging signal to the wireless charging equipment 100.

Here, the terminal information may include information collected through the charging function of the wireless charging equipment 100 such as a place for wireless charging, a time for wireless charging, a charging frequency, the number of terminals which are simultaneously charged in order to determine dense population, terminals charged frequently on a wireless charging history together, and a charging amount of the terminal, and personal information such as gender and age of the user of the terminal 200.

Further, the first control unit 220 displays a message representing whether to provide a charging situation and information on a display unit (not illustrated).

The battery 230 supplies the power to the corresponding terminal 200. Further, the battery 230 may perform a charging function based on the charging signal transmitted from the wireless charging equipment 100 by a control of the first control unit 220.

Further, in the terminal 200 while charging, when an automatic update function for a firmware installed in the corresponding terminal 200 is completed and the corresponding terminal 200 is rebooted, the control unit 120 continuously performs the charging function by interlocking with the corresponding terminal 200.

Further, the first communication unit 210 communicates with the wireless charging equipment 100 and the like using the BLE scheme by using the BLE.

Further, the first communication unit 210 communicates with the service providing device 300 and the like by a wired/wireless communication method.

Further, when a predetermined event occurs while the corresponding terminal 200 is charging through the wireless charging equipment 100, the first control unit 220 communicates with the service providing device 300 through the first communication unit 210. Here, the predetermined event includes any one (alternatively, at least one) of a case where there is no terminal operation for a predetermined time, a case where the terminal 200 enters into a predetermined standby state, a case of immediately after charging starts according to predetermined set information, and the like.

Further, the first control unit 220 generates a firmware version information request signal for the corresponding firmware required for verifying whether an update of the firmware installed in the corresponding terminal 200 is performed. Here, the corresponding firmware version information request signal includes a kind of firmware installed in the corresponding terminal 200, version information (alternatively, firmware version information) of the firmware installed in the corresponding terminal 200, identification information of the terminal 200, and the like. In this case, the identification information of the terminal 200 includes a mobile directory number (MDN), a mobile IP, a mobile MAC, subscriber identity module (Sim) card unique information, a serial number, and the like. Further, the identification information of the terminal 200 may also include an international mobile subscriber identity (IMSI) of a USIM provided in the terminal 200, a unique international mobile equipment identity (IMEI) of the terminal 200, and the like.

Further, the first control unit 220 transmits the generated firmware version information request signal to the service providing device 300 through the first communication unit 210.

Further, the first control unit 220 receives a firmware version information response signal transmitted from the service providing device 300 through the first communication unit 210 in response to the transmitted firmware version information request signal. Here, the firmware version information response signal includes a kind of firmware installed in the corresponding terminal 200, latest version information of the corresponding firmware, identification information of the terminal 200, and the like.

Further, the first control unit 220 determines (alternatively, verifies) whether to perform an update function of the firmware installed in the corresponding terminal 200 based on the received firmware version information response signal.

That is, the first control unit 220 compares the latest version information included in the received firmware version information response signal with the version information of the firmware installed in the corresponding terminal 200 to determine whether the version information of the firmware installed in the corresponding terminal 200 maintains the latest state.

As the determined result, when it is not required to perform the firmware update function, the first control unit 220 continuously performs the charging function of the battery 230 through the wireless charging equipment 100.

That is, as the determined result, when the version information of the firmware installed in the corresponding terminal 200 is the same as the latest version information included in the received firmware version information response signal, the first control unit 220 determines that the firmware installed in the corresponding terminal 200 is maintained in the latest state to perform the charging function of the battery 230 through the wireless charging equipment 100 without performing the firmware update function.

Further, as the determined result, when it is required to perform the firmware update function, the first control unit 220 performs the update function for the firmware installed in the corresponding terminal 200 by interlocking with the service providing device 300. In this case, when performing the firmware update function, the first control unit 220 continuously performs the charging function through the wireless charging equipment 100 and performs the firmware update function through the service providing device 300 in a background state.

That is, as the determined result, when the version information of the firmware installed in the corresponding terminal 200 is different from the latest version information included in the received firmware version information response signal, the first control unit 220 determines that the firmware installed in the corresponding terminal 200 is not maintained in the latest state to perform the charging function of the battery 230 through the wireless charging equipment 100 and communicates with the service providing device 300 by the first communication unit 210 to perform the firmware update function in the background state.

Further, when the corresponding firmware update function is completed, the first control unit 220 stores information on the wireless charging equipment 100 while charging in a storage unit (not illustrated) and performs a rebooting function for the corresponding terminal 200.

Further, after performing the rebooting function, the first control unit 220 communicates with the corresponding wireless charging equipment 100 through the first communication unit 210 based on the information on the wireless charging equipment 100 stored in the storage unit.

Further, the control unit 220 continuously performs the charging function of the battery 230 by interlocking with the re-accessed wireless charging equipment 100.

Further, the first control unit 220 displays a battery charging state through the wireless charging equipment 100, a firmware update state through the service providing device 300, and the like on the display unit (not illustrated).

Further, when an event, such as a case where the operation for the corresponding terminal 200 occurs while updating the firmware pre-installed in the corresponding terminal 200 by interlocking with the service providing device 300 and a case where the terminal 200 enters into a predetermined operation state, occurs, the first control unit 220 displays a screen for verifying whether to perform a continuous update function of the firmware while updating on the corresponding display unit and may continuously perform the update function according to user selection (alternatively, user input) selected from the displayed screen or stop (alternatively, interrupt) the update function.

Further, when the event, such as a case where the operation for the corresponding terminal 200 occurs while updating the firmware pre-installed in the corresponding terminal 200 by interlocking with the service providing device 300 and a case where the terminal 200 enters into a predetermined operation state, occurs, the first control unit 220 may temporarily stop the update function of the firmware while updating.

Further, even when the charging for the corresponding battery 230 is completed (alternatively, stops) by interlocking between the wireless charging equipment 100 and the terminal 200 (alternatively, when the corresponding terminal 200 is in a non-contact state with the wireless charging equipment 100), the first control unit 220 may continuously perform or temporarily stop the update function of the firmware while updating.

The battery 230 supplies the power to the corresponding terminal 200.

Further, the battery 230 performs a charging function based on the charging signal transmitted from the wireless charging equipment 100 by a control of the first control unit 220.

Figure 5:
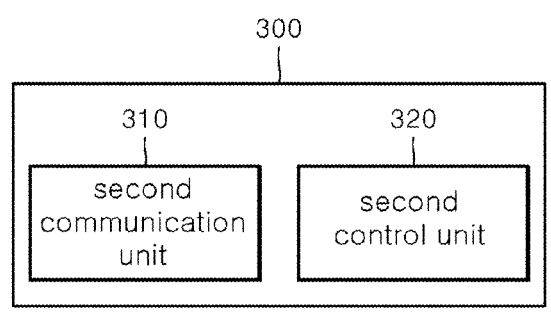
FIG. 5 is a block diagram illustrating a configuration of a service providing device according to the embodiment of the present invention.

As illustrated in FIG. 5, the service providing device 300 is constituted by a second communication unit 310 and a second control unit 320. All of the constituent elements of the service providing device 300 illustrated in FIG. 5 are not required constituent elements, and the service providing device 300 may be implemented by more constituent elements than the constituent elements illustrated in FIG. 5 or less constituent elements therethan.

The second communication unit 310 communicates with the terminal 200 by a wired/wireless communication method.

Further, the second communication unit 310 receives the firmware version information request signal generated from the corresponding terminal 200 to be transmitted to the service providing device 300 when a predetermined event including a case where there is no terminal operation for a predetermined time, a case where the terminal 200 enters into the predetermined standby state, a case of immediately after the charging starts according to the predetermined set information, and the like occurs. Here, the corresponding firmware version information request signal includes a kind of firmware installed in the corresponding terminal 200, version information (alternatively, firmware version information) of the firmware installed in the corresponding terminal 200, identification information of the terminal 200, and the like.

The second control unit 320 executes an overall control function of the service providing device 300.

Further, the second control unit 320 transmits a firmware version information response signal to the corresponding terminal 200 through the second communication unit 310 in response to the received firmware version information request signal. Here, the firmware version information response signal includes a kind of firmware installed in the corresponding terminal 200, latest version information of the corresponding firmware, identification information of the terminal 200, and the like.

Further, in the case of requesting the firmware update in the corresponding terminal 200 by the firmware version information response signal transmitted to the terminal 200, the second control unit 320 updates the pre-installed firmware in the corresponding terminal 200 by interlocking with the corresponding terminal 200. In this case, when updating the firmware installed in the terminal 200 by interlocking between the service providing device 300 and the terminal 200, the corresponding terminal 200 continuously performs the charging function through the wireless charging equipment 100 and performs the update function for the firmware installed in the corresponding terminal 200 in the background state.

Further, the second control unit 320 verifies (alternatively, manages) whether the firmware update function for the corresponding terminal 200 is normally completed by transmitting and receiving the information to and from the terminal 200.

In the embodiment of the present invention, it is described that the function of determining whether to update the firmware pre-installed in the terminal 200 is performed in the corresponding terminal 200, but is not limited thereto. The service providing device 300 determines whether to update the firmware by comparing the latest version information of the corresponding firmware pre-stored (alternatively, registered) in the service providing device 300 with the version information of the firmware installed in the corresponding terminal 200 included in the firmware version information request signal transmitted from the terminal 200 to the service providing device 300 and may update the firmware installed in the corresponding terminal 200 by interlocking between the service providing device 300 and the terminal 200 in the case where the firmware update is required as the determined result.

As such, when the predetermined event, such as the case where there is no terminal operation for a predetermined time, the case where the terminal enters into the predetermined standby state, and the case corresponding to immediately after the charging starts according to the predetermined set information, occurs, the terminal may perform the update function for the firmware installed in the terminal by interlocking with the service providing device.

When the terminal 200 adjacent to the wireless charging equipment 100 performs the wireless charging through the corresponding wireless charging equipment 100, the wireless charging equipment 100 verifies predetermined class information for the corresponding terminal 200 based on the identification information of the corresponding terminal 200. Thereafter, the wireless charging equipment 100 allocates one or more channels corresponding to the verified class information among a plurality of channels pre-divided based on the verified class information. Thereafter, the wireless charging equipment 100 provides the wireless charging function to the corresponding terminal 200 with a wireless charging intensity corresponding to one or more allocated channels.

Further, the control unit 120 transmits the corresponding power beacon signal through the communication unit 110 at a predetermined time interval only within a store (alternatively, an area/region) where the corresponding wireless charging equipment 100 is provided and does not transmit the power beacon signal to the terminal which is not positioned in the store, but positioned in a transmittable radius for the signal of the wireless charging equipment 100.

That is, the control unit 120 determines whether the terminal 200 enters the store where the corresponding wireless charging equipment 100 is installed and transmits the power beacon signal to only the terminal 200 entering the corresponding store. Here, the control unit 120 determines (alternatively, judges/verifies) whether the terminal 200 enters the store through a change in intensity of a Wi-Fi signal, a change in intensity of a beacon signal (alternatively, a BLE beacon signal), a change in signal intensity of the PTU provided in the wireless charging equipment 100, and the like.

Further, the control unit 120 verifies predetermined class information for the corresponding terminal 200 based on the identification information of the terminal 200 connected to the corresponding wireless charging equipment 100 (alternatively, unique information of the PRU included in the corresponding terminal 200). Here, the predetermined class information for the corresponding terminal 200 may be information set by the service providing device (not illustrated) based on motion accumulated in one or more stores pre-set by the corresponding terminal 200, region movement information in the store, product purchase history information in the store, and the like.

That is, as listed in the following Table 1, the control unit 120 verifies class information corresponding to the identification information of the connected terminal 200 in pre-stored class information for each terminal. In this case, in the case where there is no class information corresponding to the identification information of the corresponding terminal 200 in the pre-stored class information for each terminal, the control unit 120 sets (alternatively, verifies/matches) the class of the corresponding terminal 200 as a predetermined minimum class.

TABLE 1

| | Terminal name (identification information of terminal) | | | |
|---|---|---|---|---|
| | First terminal | Second terminal | ... | N-th terminal |
| Class | C | S | ... | A |

Further, the control unit 120 generates a plurality of channels (alternatively, a power transmission capacity) by dividing the entire power providable from the corresponding wireless charging equipment 100 into predetermined minimum power units (alternatively, predetermined power units).

For example, when the entire scale of the power (alternatively, a power source) supplied to the wireless charging equipment 100 from a power source line (not illustrated) is 1,000 mA, the control unit 120 generates 18 channels by dividing the entire providable power (for example, the entire scale of 1,000 mA−100 mA of power required for driving=900 mA) which is the remaining power except for the power (for example, 100 mA which is 10% of the entire scale) required for driving (alternatively, controlling) of the corresponding wireless charging equipment 100 into 50 mA as the predetermined minimum power unit.

Further, the control unit 120 may set the number of terminals acceptable in the corresponding wireless charging equipment 100.

Further, the control unit 120 sets the number of use channels for each class information.

That is, as listed in the following Table 2, the control unit 120 sets the number of use channels for each predetermined class (for example, classes C to S).

TABLE 2

| | Class | | | |
|---|---|---|---|---|
| | S | A | B | C |
| Number of use channels | Four channels | Three channels | Two channels | One channel |

Further, the control unit 120 allocates one or more channels corresponding to the predetermined class information with respect to the corresponding terminal 200 verified above among the plurality of pre-divided channels (alternatively, channels having the number of use channels corresponding to the predetermined class information with respect to the corresponding terminal 200).

Further, the control unit 120 provides the wireless charging function to the corresponding terminal 200 with the wireless charging intensity (alternatively, wireless charging sensitivity) corresponding to one or more allocated channels.

Further, the first control unit 220 transmits a control signal (for example, a PRU advertisement signal) to the wireless charging equipment 100 through the first communication unit 210 in order to request connection (alternatively, communication) with the corresponding wireless charging equipment 100 based on the power beacon signal transmitted from the wireless charging equipment 100, in the A4WP scheme wireless charging. Here, the PRU advertisement signal includes unique information (alternatively, a sharing ID) of the PRU included in the corresponding terminal 200, version information of the corresponding PRU, a manufacturing number of the corresponding PRU, identification information of the corresponding terminal 200, and the like. In this case, the identification information of the terminal 200 includes an MDN, a mobile IP, a mobile MAC, Sim card unique information, a serial number, and the like. Further, the identification information of the terminal 200 may also include an IMSI of a USIM provided in the terminal 200, a unique IMEI of the terminal 200, and the like.

Further, the first control unit 220 charges the battery 230 with the wireless charging intensity provided from the wireless charging equipment 100 by the number of channels allocated based on the predetermined class information corresponding to the terminal 200 (alternatively, the identification information of the terminal 200).

As such, in the wireless charging equipment and one or more terminals communicating through the BLE additionally defined in the A4WP scheme wireless charging, the entire power providable in the wireless charging equipment is divided into the plurality of channels, one or more channels corresponding to the class information of the corresponding terminal are allocated among the plurality of channels divided based on the predetermined class information with respect to the terminal to perform the charging function through the corresponding wireless charging equipment, and the power (alternatively, the wireless charging intensity) corresponding to one or more allocated channels may be provided to the corresponding terminal.

Further, as such, with respect to the plurality of terminals to perform the charging function through the wireless charging equipment, the power (alternatively, the wireless charging intensity) for each terminal is set based on the class information set with respect to each terminal and the set power may be provided for each corresponding terminal.

Hereinafter, a control method of the wireless charging system according to the present invention will be described in detail with reference to FIGS. 1 to 11.

Figure 6:
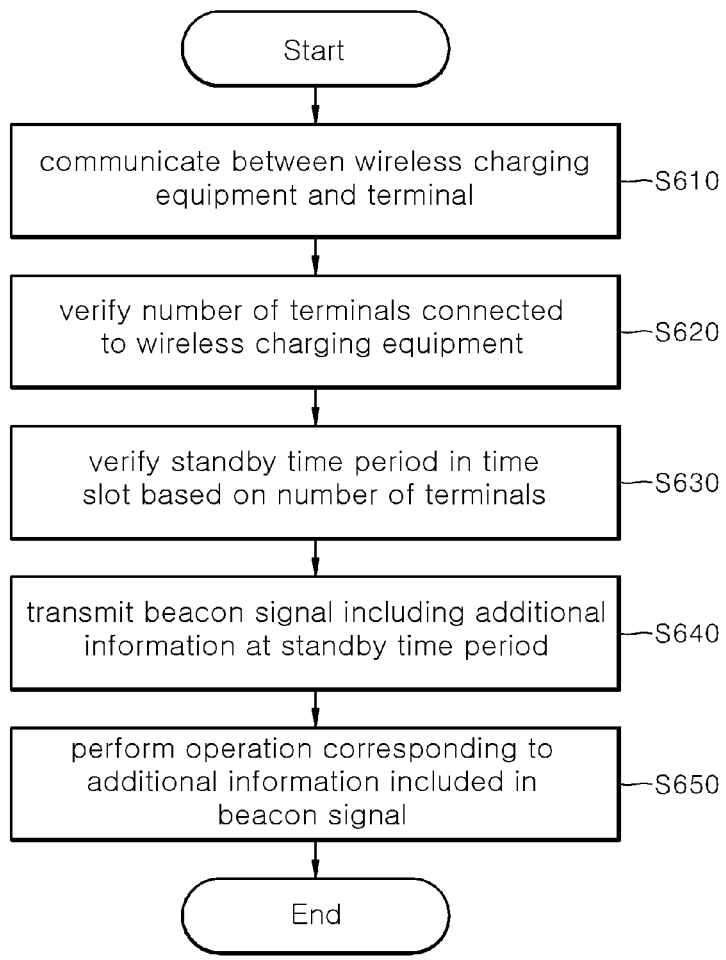
FIG. 6 is a flowchart illustrating a control method of a wireless charging system according to a first embodiment of the present invention.

FIG. 6 is a flowchart illustrating a control method of the wireless charging system according to a first embodiment of the present invention.

First, in A4WP scheme wireless charging, wireless charging equipment 100 (alternatively, a PTU) transmits a power beacon signal at a predetermined time interval.

Further, one or more terminals 200 including a PRU adjacent to the corresponding wireless charging equipment 100 receive the power beacon signal transmitted from the wireless charging equipment 100 and establishes connection (alternatively, communication) with the corresponding wireless charging equipment 100 based on the received power beacon signal.

As an example, the wireless charging equipment 100 transmits (alternatively, propagates) the power beacon signal to a first terminal and a second terminal which include PRUs adjacent to the corresponding wireless charging equipment 100, respectively. Further, each of the first terminal and the second terminal receives the power beacon signal transmitted from the wireless charging equipment 100 and communicates with the corresponding wireless charging equipment 100 based on the received power beacon signal (S610).

Thereafter, the wireless charging equipment 100 verifies (alternatively, determines) the number of terminals connected to the corresponding wireless charging equipment 100. In this case, the terminal connected to the wireless charging equipment 100 charges the battery provided in the corresponding terminal based on the charging signal transmitted from the corresponding wireless charging equipment 100.

As an example, the wireless charging equipment 100 verifies the first terminal and the second terminal connected with the corresponding wireless charging equipment 100 (S620).

Thereafter, the wireless charging equipment 100 verifies (alternatively, determines/predicts) an empty time period (alternatively, an idle/standby time period) without transmitting the corresponding charging signal to one or more terminals 200 connected with the corresponding wireless charging equipment 100 in a time slot (alternatively, a total data transmittable time) based on the verified number of terminals, in order to verify a time period (alternatively, a time/time zone) without transmitting the charging signal to one or more terminals 200 connected with the corresponding wireless charging equipment 100.

That is, the wireless charging equipment 100 verifies the remaining time period (alternatively, the empty time period/empty time zone) except for the time of transmitting the charging signal to one or more terminals in the time slot based on the verified number of terminals. Here, the charging signal is transmitted at the predetermined time interval.

Figure 7:
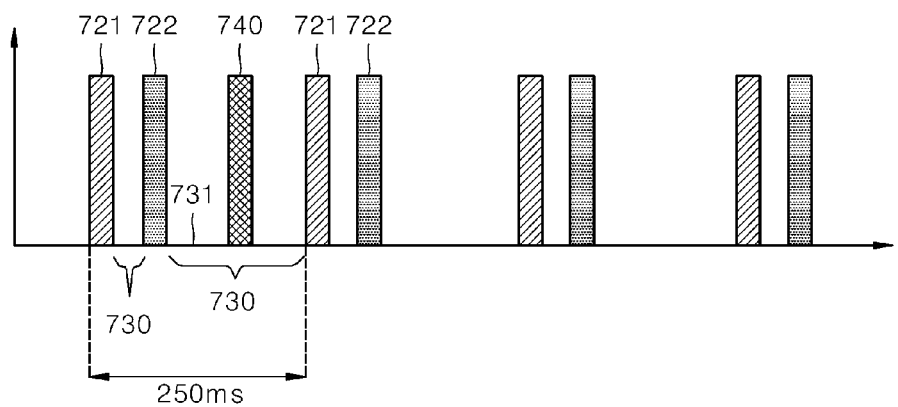
FIG. 7 is a diagram illustrating a time slot (alternatively, a time sequence) according to the first embodiment of the present invention.

As an example, as illustrated in FIG. 7, the wireless charging equipment 100 verifies the remaining time period 730 (alternatively, time zone) except for a time zone 721 for transmitting the charging signal to the first terminal and a time zone 722 for transmitting the charging signal to the second terminal in the time slot 410. In this case, the charging signal transmitted to the first terminal and the second terminal may be transmitted at the predetermined time interval (for example, 250 ms) (S630).

Thereafter, the wireless charging equipment 100 transmits a beacon signal including additional information to one or more terminals 200 connected with the corresponding wireless charging equipment 100 based on the verified empty time period, respectively. Here, the additional information includes coupon information, product information, and the like in a store (alternatively, an area/region) where the corresponding wireless charging equipment 100 is installed (alternatively, provided).

That is, the wireless charging equipment 100 verifies a time period enough to transmit the additional information in the verified empty time period and transmits the beacon signal including the corresponding additional information to one or more terminals 200 in the verified time period enough to transmit the corresponding additional information. In this case, the wireless charging equipment 100 may also transmit the beacon signal by a broadcasting scheme.

As an example, the wireless charging equipment 100 verifies a time period 731 enough to transmit the beacon signal including the additional information (for example, including the coupon information, the product information, and the like) in an empty time period 730 illustrated in FIG. 7 and transmits a beacon signal 740 including the corresponding additional information by the broadcasting method in the verified time period 731 (alternatively, within the verified time period 731). That is, when the empty time period 730 illustrated in FIG. 7 is 150 ms and an area corresponding to about 50 ms is required in order to transmit the beacon signal including the additional information, the wireless charging equipment 100 transmits the beacon signal 740 including the corresponding additional information by the broadcasting method within the corresponding empty time period 730 (for example, at the time when early 50 ms elapses in 150 ms which is the empty time period) (S640).

Thereafter, each of one or more terminals 200 receives the beacon signal including the additional information transmitted from the wireless charging equipment 100.

Further, the corresponding terminal 200 performs an operation (alternatively, a control) corresponding to the additional information included in the corresponding beacon signal based on the received beacon signal.

As an example, the terminal 200 receives the beacon signal including the additional information (for example, including the coupon information, the product information, and the like) transmitted from the wireless charging equipment 100 and displays the additional information included in the received beacon signal on the display unit (not illustrated) (S650).

Figure 8:
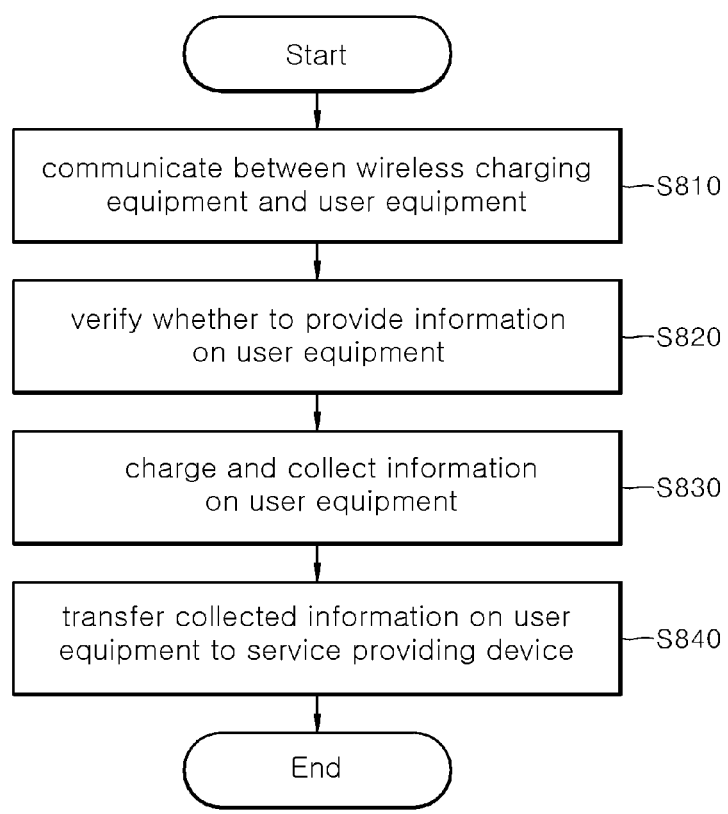
FIG. 8 is a flowchart illustrating an operating method of a wireless charging system according to a second embodiment of the present invention.
Figure 9:
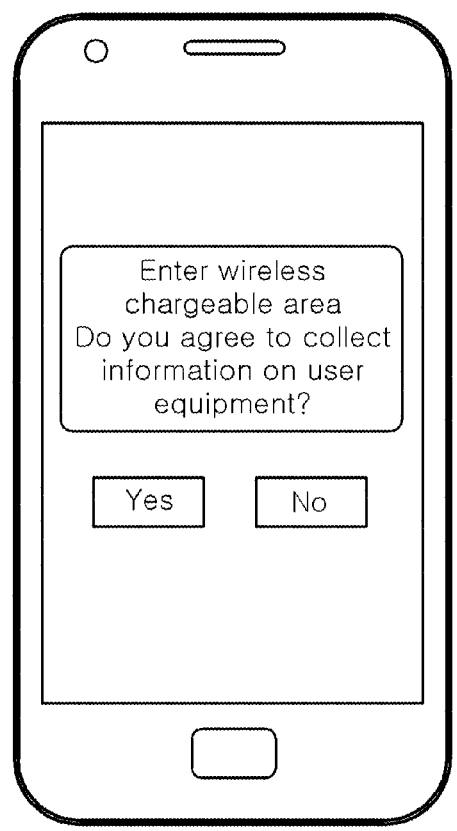
FIG. 9 is a diagram illustrating a message which may be displayed on a terminal while operating the wireless charging system according to the second embodiment of the present invention.

FIG. 8 is a flowchart illustrating an operation method of the wireless charging system according to a second embodiment of the present invention. FIG. 9 is a diagram illustrating a message which may be displayed on a terminal while operating the wireless charging system according to the second embodiment of the present invention.

First, communication between the wireless charging equipment 100 and the terminal 200 is performed (S810). A wireless chargeable range of the wireless charging equipment 100 may be formed to be equal to or smaller than a communicable range.

As a result, when the terminal 200 is positioned within the communicable range of the wireless charging equipment 100, but positioned out of the wireless chargeable range, the wireless charging between the wireless charging equipment 100 and the terminal 200 is impossible.

The present invention is to transfer the information of the terminal 200 collected through charging to the service providing device 300 and will be described on the assumption that the terminal 200 is positioned in the wireless chargeable range of the wireless charging equipment 100.

Accordingly, in step S810, the performing of the communication between the wireless charging equipment 100 and the terminal 200 means that the terminal 200 is positioned in the wireless chargeable range of the wireless charging equipment 100 to simultaneously perform the wireless charging and the communication.

In step S810, when the communication is performed, next, whether to provide the terminal information is verified (S820).

As illustrated in FIG. 9, in the case where the terminal 200 is registered to agree to provide the terminal information to the wireless charging equipment 100 or the terminal 200 agrees to provide the terminal information even though the terminal 200 is not pre-registered in the wireless charging equipment 100, the terminal 200 may provide the wireless charging power and simultaneously, collect the terminal information.

Next, the wireless charging equipment 100 supplies the charging power to the terminal 200 and simultaneously, collects the terminal information from the terminal 200 (S830). The process of collecting the terminal information from the terminal 200 may be performed by communication using the BLE scheme.

The terminal information may include information collected through the charging function of the wireless charging equipment 100 such as a place for wireless charging, a time for wireless charging, a charging frequency, the number of terminals which are simultaneously charged in order to determine dense population, terminals charged frequently on a wireless charging history together, and a charging amount of the terminal, and personal information such as gender and age of the user of the terminal 200.

Here, the information on the place for wireless charging may be acquired by area information of a store (alternatively, an area/region) where the corresponding wireless charging equipment 100 is installed (alternatively, provided).

Next, the collected terminal information is transferred to the service providing device 300 through the communication network (S840). The service providing device 300 may receive, edit, and store the terminal information.

Figure 10:
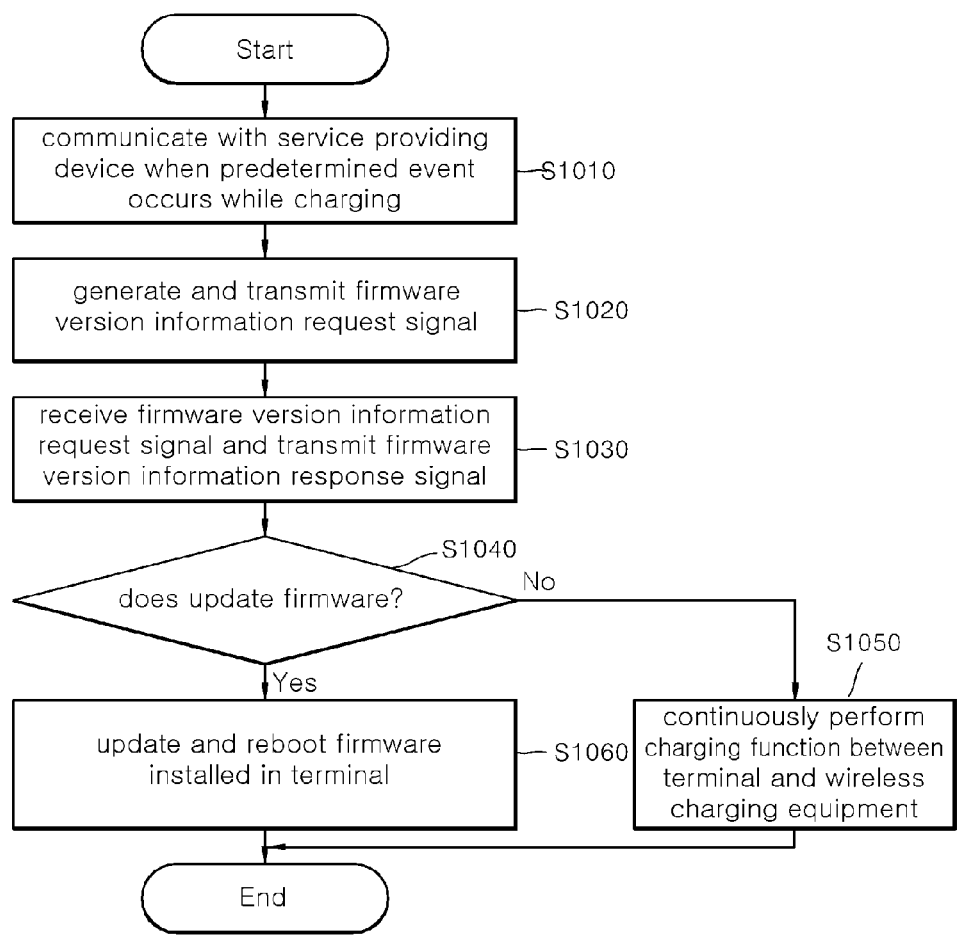
FIG. 10 is a flowchart illustrating a control method of a wireless charging system according to a third embodiment of the present invention.

FIG. 10 is a flowchart illustrating a control method of the wireless charging system according to a third embodiment of the present invention.

First, in the case where a predetermined event occurs while the terminal 200 is charging through the wireless charging equipment 100, the terminal 200 communicates with the service providing device 300. Here, the predetermined event includes a case where there is no terminal operation for a predetermined time, a case where the terminal 200 enters into a predetermined standby state, a case of immediately after charging starts according to predetermined set information, and the like.

As an example, while the terminal 200 is charging through the wireless charging equipment 100, when there is no operation for the terminal 200 by the user for the predetermined time (for example, 3 minutes), the terminal 200 communicates with the service providing device 300 (S1010).

Thereafter, the terminal 200 generates a firmware version information request signal for the corresponding firmware required for verifying whether to update the firmware installed in the corresponding terminal 200. Here, the corresponding firmware version information request signal includes a kind of firmware installed in the corresponding terminal 200, version information (alternatively, firmware version information) of the firmware installed in the corresponding terminal 200, identification information of the terminal 200, and the like. In this case, the identification information of the terminal 200 includes an MDN, a mobile IP, a mobile MAC, Sim card unique information, a serial number, and the like. Further, the identification information of the terminal 200 may also include an IMSI of a USIM provided in the terminal 200, a unique IMEI of the terminal 200, and the like.

Further, the terminal 200 transmits the generated firmware version information request signal to the service providing device 300.

As an example, the terminal 200 generates the firmware version information request signal including a kind of firmware installed in the corresponding terminal 200, version information of the firmware installed in the corresponding terminal 200, the identification information of the terminal 200, and the like and transmits the generated firmware version information request signal to the service providing device 300 (S1020).

Thereafter, the service providing device 300 receives the firmware version information request signal transmitted from the terminal 200.

Further, the service providing device 300 transmits a firmware version information response signal to the terminal 200 in response to the received firmware version information request signal. Here, the firmware version information response signal includes a kind of firmware installed in the corresponding terminal 200, latest version information of the corresponding firmware, identification information of the terminal 200, and the like.

As an example, the service providing device 300 generates a firmware version information response signal including a kind of firmware installed in the corresponding terminal 200, latest version information (for example, v.1.5) of the corresponding firmware, identification information of the terminal 200, and the like in response to the received firmware version information request signal and transmits the generated firmware version information response signal to the corresponding terminal 200 (S1030).

Thereafter, the terminal 200 receives the firmware version information response signal transmitted from the service providing device 300 in response to the transmitted firmware version information request signal.

Further, the terminal 200 determines (alternatively, verifies) whether to perform the update function of the firmware installed in the corresponding terminal 200 based on the received firmware version information response signal.

That is, the terminal 200 compares the version information of the firmware installed in the corresponding terminal 200 with the latest version information included in the received firmware version information response signal to determine whether the version information of the firmware installed in the corresponding terminal 200 is maintained in the latest state.

As an example, the terminal 200 determines whether the version information of the firmware installed in the corresponding terminal 200 is equal to the latest version information (for example, v.1.5) included in the received firmware version information response signal.

As the determined result, in the case where it is not required to perform the update function of the firmware, the terminal 200 continuously performs the charging function through the wireless charging equipment 100.

That is, as the determined result, when the version information of the firmware installed in the corresponding terminal 200 is the same as the latest version information included in the received firmware version information response signal, the terminal 200 determines that the firmware installed in the corresponding terminal 200 is maintained in the latest state to continuously perform the charging function through the wireless charging equipment 100 without performing the firmware update function.

As an example, when the version information of the firmware installed in the corresponding terminal 200 is the same as the latest version information (for example, v.1.5) included in the received firmware version information response signal, the terminal 200 continuously performs the charging function through the wireless charging equipment 100 without performing the firmware update function (S1050).

Further, as the determined result, when it is required to perform the firmware update function, the terminal 200 performs the update function for the firmware installed in the corresponding terminal 200 by interlocking with the service providing device 300. In this case, when performing the firmware update function, the terminal 200 continuously performs the charging function through the wireless charging equipment 100 and performs the firmware update function through the service providing device 300 in a background state.

That is, as the determined result, when the version information of the firmware installed in the corresponding terminal 200 is different from the latest version information included in the received firmware version information response signal, the terminal 200 determines that the firmware installed in the corresponding terminal 200 is not maintained in the latest state to perform the charging function through the wireless charging equipment 100 and perform the firmware update function through the service providing device 300 in the background state.

As an example, when the version information of the firmware installed in the corresponding terminal 200 is lower than (alternatively, different from) the latest version information (for example, v.1.5) included in the received firmware version information response signal, the terminal performs the firmware update function in the background state.

Further, after the corresponding firmware update function is completed, the terminal 200 performs a rebooting function for the corresponding terminal 200.

Further, after performing the rebooting function, the terminal 200 continuously performs the charging function by interlocking with the wireless charging equipment 100 (S1060).

Figure 11:
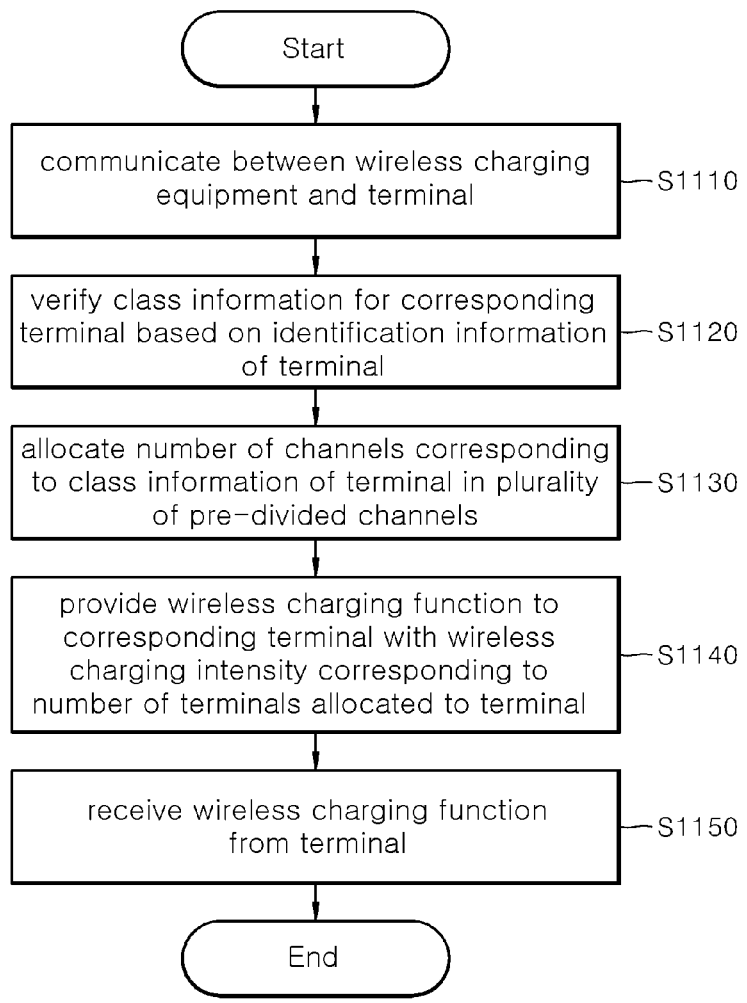
FIG. 11 is a flowchart illustrating a control method of a wireless charging system according to a fourth embodiment of the present invention.

FIG. 11 is a flowchart illustrating a control method of the wireless charging system according to a fourth embodiment of the present invention.

First, in A4WP scheme wireless charging, wireless charging equipment 200 (alternatively, a PTU) transmits a power beacon signal at a predetermined time interval.

Further, a terminal 200 adjacent to the corresponding wireless charging equipment 100 receives the power beacon signal transmitted from the wireless charging equipment 100.

Further, the terminal 200 generates a PRU advertisement signal in response to the power beacon signal and transmits the generated PRU advertisement signal to the wireless charging equipment 100. Here, the PRU advertisement signal includes unique information (alternatively, a sharing ID) of the PRU included in the corresponding terminal 200, version information of the corresponding PRU, a manufacturing number of the corresponding PRU, identification information of the corresponding terminal 200, and the like. In this case, the identification information of the terminal 200 includes an MDN, a mobile IP, a mobile MAC, Sim card unique information, a serial number, and the like. Further, the identification information of the terminal 200 may also include an IMSI of a USIM provided in the terminal 200, a unique IMEI of the terminal 200, and the like.

Further, the wireless charging equipment 100 receives the PRU advertisement signal transmitted from the terminal 200 receiving the corresponding power beacon signal in response to the transmitted power beacon signal.

Further, the wireless charging equipment 100 communicates with the corresponding terminal 200 based on the received PRU advertisement signal.

As an example, the wireless charging equipment 100 transmits (alternatively, propagates) the power beacon signal to a first terminal and a second terminal which include PRUs adjacent to the corresponding wireless charging equipment 100. Thereafter, each of the first terminal and the second terminal adjacent to the corresponding wireless charging equipment 100 receives the power beacon signal transmitted from the wireless charging equipment 100. Thereafter, the first terminal generates a first PRU advertisement signal and transmits the generated first PRU advertisement signal to the wireless charging equipment 100. Further, the second terminal generates a second PRU advertisement signal and transmits the generated second PRU advertisement signal to the wireless charging equipment 100. Thereafter, the wireless charging equipment 100 receives the first PRU advertisement signal and the second PRU advertisement signal transmitted from the first terminal and the second terminal in response to the transmitted power beacon signal, respectively. Thereafter, the wireless charging equipment 100 communicates with the first terminal based on the received first PRU advertisement signal. Further, the wireless charging equipment 100 communicates with the second terminal based on the received second PRU advertisement signal (S1110).

Thereafter, the wireless charging equipment 100 verifies predetermined class information for the corresponding terminal 200 based on the identification information of the connected terminal 200 (alternatively, unique information of the PRU included in the corresponding terminal 200). Here, the predetermined class information for the corresponding terminal 200 may be information set by the service providing device (not illustrated) based on motion accumulated in one or more stores pre-set by the corresponding terminal 200, region movement information in the store, product purchase history information in the store, and the like.

That is, the wireless charging equipment 100 verifies the class information corresponding to the identification information of the connected terminal 200 in the pre-stored class information for each terminal. In this case, in the case where there is no class information corresponding to the identification information of the corresponding terminal 200 in the pre-stored class information for each terminal, the wireless charging equipment 100 sets (alternatively, verifies/matches) the class of the corresponding terminal 200 as a predetermined minimum class.

As an example, the wireless charging equipment 100 verifies the class information (for example, class C) for the first terminal corresponding to the identification information of the first terminal in the class information for each pre-stored terminal as listed in Table 1 and verifies the class information (for example, class S) for the second terminal corresponding to the identification information of the second terminal (S1120).

Thereafter, the wireless charging equipment 100 allocates one or more channels corresponding to the predetermined class information for the corresponding terminal 200 verified in the plurality of pre-divided channels. Here, the plurality of channels (alternatively, the power transmission capacity) may divide and generate the entire power providable in the corresponding wireless charging equipment 100 into a predetermined minimum power unit.

That is, the wireless charging equipment 100 allocates the number of channels corresponding to the predetermined class information for the corresponding terminal 200 verified in the plurality of pre-divided channels.

As an example, the wireless charging equipment 100 allocates one channel corresponding to the class C which is the verified class information for the first terminal and allocates four channels corresponding to the class S which is the verified class information for the second terminal in the plurality of pre-divided channels as listed in Table 2. Here, the plurality of divided channels may be in a predetermined state as 50 mA which is each minimum unit (S1130).

Thereafter, the wireless charging equipment 100 provides the wireless charging function to the corresponding terminal 200 with the wireless charging intensity (alternatively, wireless charging sensitivity) corresponding to one or more allocated channels.

That is, the wireless charging equipment 100 provides the wireless charging function to the corresponding terminal 200 with the wireless charging intensity corresponding to the number of channels allocated to the terminal.

As an example, the wireless charging equipment 100 provides the wireless charging function to the corresponding first terminal with 50 mA corresponding to one channel set for the first terminal and provides the wireless charging function to the corresponding second terminal with 200 mA (for example, four 50 mA which is the minimum unit are allocated) corresponding to four channels set for the second terminal (S1140).

Thereafter, the corresponding terminal 200 receives the wireless charging function provided from the wireless charging equipment 100.

As an example, the first terminal receives the wireless charging function from the wireless charging equipment 100 providing the power of 50 mA. Further, the second terminal receives the wireless charging function from the wireless charging equipment 100 providing the power of 200 mA (S1150).

The wireless charging equipment, the terminal, and the wireless charging system comprising the same according to the embodiment of the present invention may be prepared with a computer program, and codes and code segments configuring the computer program may easily deduced by a computer programmer in the art. Further, the corresponding computer program is stored in the non-transitory computer readable storage medium, and read and executed by the computer or the wireless charging equipment, the terminal (alternatively, user equipment) including the PRU, and the like to implement the wireless charging equipment, the terminal, and the wireless charging system comprising the same.

The non-transitory computer readable storage medium includes a magnetic storage medium, an optical storage medium, and a carrier wave medium. The computer program implementing the wireless charging equipment, the terminal, and the wireless charging system comprising the same according to the embodiment of the present invention may be stored and installed in embedded memories of the wireless charging equipment, the terminal (alternatively, the user equipment) including the PRU, and the like. Alternatively, external memories of a smart card and the like which store and install the computer program implementing the wireless charging equipment, the terminal, and the wireless charging system comprising the same according to the embodiment of the present invention may be installed in the wireless charging equipment, the terminal (alternatively, the user equipment) including the PRU, and the like through an interface.

As described above, it is possible to easily implement the embodiment of the present invention without a separate BLE beacon device by using a wireless charging infrastructure by transmitting additional information (alternatively, specific information) through the BLE additionally defined in the A4WP scheme wireless charging.

Further, as described above, according to the present invention, it is possible to improve operation efficiency of the entire wireless charging system by transmitting the broadcasting signal (alternatively, additional/specific information) to the peripheral BLE terminal for a time where the charging signal is not transmitted in the BLE installed in the wireless charging equipment.

Further, as described above, according to the present invention, it is possible to improve operation efficiency of the wireless charging system by collecting the charging information while charging to transmit the collected charging information to the service providing device.

Further, as described above, according to the present invention, it is possible to enlarge an application range of the wireless charging system, improve convenience of the user, and perform a stable update by continuously receiving the power from the wireless charging equipment in the firmware update process, by performing the update function for the firmware installed in the terminal by interlocking with the service providing device by the terminal, when the predetermined event corresponding to a case where there is no terminal operation for a predetermined time while the terminal is charging through the wireless charging equipment, a case where the terminal enters into a standby state, a case corresponding to immediately after the charging starts according to the predetermined set information, and the like, occurs.

Further, as described above, according to the present invention, it is possible to reduce power consumption cost of the wireless charging equipment and improve operation efficiency of the wireless charging system by dividing the entire power providable in the wireless charging equipment into the plurality of channels, allocating one or more channels corresponding to the class information of the corresponding terminal among the plurality of channels divided based on the predetermined class information with respect to the terminal to perform the charging function through the wireless charging equipment, and providing the power (alternatively, the wireless charging intensity) corresponding to one or more allocated channels to the corresponding terminal, in the wireless charging equipment and one or more terminals communicating through the BLE additionally defined in the A4WP scheme wireless charging.

Further, as described above, according to the present invention, it is possible to charge the power for each terminal and improve satisfaction and convenience of the user by establishing a retention service strategy for each terminal due to differentiation of the power supply, by setting the power (alternatively, the wireless charging intensity) for each terminal based on the class information set for each terminal with respect to the plurality of terminals to perform the charging function through the wireless charging equipment and providing the set power to each corresponding terminal.

The present invention can be widely used in a wireless charging system field, an advertisement/public relations field, and the like, by transmitting additional information (alternatively, specific information) to the peripheral BLE terminal for a time where the charging signal is not transmitted in the corresponding BLE by using the BLE of the resonance scheme wireless charging equipment to easily implement the present invention without a separate BLE beacon device by using the wireless charging infrastructure and improve operation efficiency of the entire wireless charging system.

Hereinabove, although the present invention is described by specific matters such as concrete components, and the like, embodiments, and drawings, they are provided only for assisting in the entire understanding of the present invention. Therefore, the present invention is not limited to the embodiments. Various modifications and changes may be made by those skilled in the art to which the present invention pertains from this description.

Therefore, the spirit of the present invention should not be limited to the above-described embodiments and the following claims as well as all modified equally or equivalently to the claims are intended to fall within the scope and spirit of the invention.

What is claimed is:

1. Wireless charging equipment comprising:
    a communication unit configured to communicate based on a Bluetooth low energy (BLE) scheme; and
    a control unit configured to control the communication unit to verify the number of terminals connected to the wireless charging equipment including the communication unit, verify a standby time period when the charging signal is not transmitted to the terminal connected to the wireless charging equipment in a time slot based on the verified number of terminals, and transmit a beacon signal including additional information based on the verified standby time period by a broadcasting method.

2. The wireless charging equipment of claim 1, wherein the control unit predicts the standby time period when the charging signal is not transmitted to the terminal connected to the wireless charging equipment based on the verified number of terminals.

3. The wireless charging equipment of claim 1, wherein the additional information includes coupon information and product information in a store where the wireless charging equipment is installed.

4. The wireless charging equipment of claim 1, wherein the control unit controls the communication unit to verify a time period when the beacon signal including the additional information is transmittable in the standby time period and transmit the beacon signal to the terminal at the verified time period when the beacon signal is transmittable.

5. The wireless charging equipment of claim 1, wherein the control unit controls the communication unit to transmit the beacon signal to the terminal connected to the wireless charging equipment.

6. A control method of wireless charging equipment comprising:
    communicating with one or more terminals based on a BLE scheme by means of a communication unit;
    verifying the number of terminals connected to the wireless charging equipment including the communication unit by means of a control unit;
    verifying a standby time period when a charging signal is not transmitted to the terminal connected to the wireless charging equipment in a time slot based on the verified number of terminals by means of the control unit; and
    controlling the communication unit to transmit a beacon signal including additional information based on the verified standby time period by a broadcasting method by means of the control unit.

7. The control method of claim 6, wherein the controlling of the communication unit to transmit the beacon signal includes:
    verifying a time period when the beacon signal is transmittable in the verified standby time period by means of the control unit; and
    controlling the communication unit to transmit the beacon signal to the terminal connected to the wireless charging equipment at the verified time period when the beacon signal is transmittable, respectively.

8. A wireless charging system comprising:
    a terminal configured to be wirelessly charged by an alliance for wireless power (A4WP) scheme; and
    wireless charging equipment configured to verify a standby time period when the charging signal is not transmitted to the terminal in a time slot based on the verified number of terminals and transmit a beacon signal including additional information based on the verified standby time period by a broadcasting method.

* * * * *